(12) United States Patent
Pyun

(10) Patent No.: US 11,873,030 B2
(45) Date of Patent: Jan. 16, 2024

(54) UNDERBODY FOR VEHICLE

(71) Applicants: Hyundai Motor Company, Seoul (KR); Kia Corporation, Seoul (KR)

(72) Inventor: Sung Don Pyun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/672,295

(22) Filed: Feb. 15, 2022

(65) Prior Publication Data

US 2022/0266923 A1    Aug. 25, 2022

(30) Foreign Application Priority Data

Feb. 25, 2021    (KR) .......................... 10-2021-0025222

(51) Int. Cl.
*B62D 25/20* (2006.01)
*B62D 25/10* (2006.01)
*B62D 25/02* (2006.01)
*B62D 25/14* (2006.01)

(52) U.S. Cl.
CPC ........... *B62D 25/20* (2013.01); *B62D 25/025* (2013.01); *B62D 25/10* (2013.01); *B62D 25/14* (2013.01); *B62D 25/2018* (2013.01); *B62D 25/2027* (2013.01)

(58) Field of Classification Search
CPC .............. B62D 25/00; B62D 25/2018; B62D 25/025; B62D 25/14; B62D 25/2027; B62D 25/20; B62D 25/2009; B62D 25/2036; B62D 25/08; B62D 27/023; B62D 24/00

USPC ................................ 296/193.01, 4, 7, 8, 204
See application file for complete search history.

(56) References Cited

U.S. PATENT DOCUMENTS

| | | | | |
|---|---|---|---|---|
| 4,557,519 A | * | 12/1985 | Matsuura | B62D 25/2027 296/187.11 |
| 7,310,878 B2 | * | 12/2007 | Chernoff | B62D 25/20 29/897 |
| 7,748,774 B2 | * | 7/2010 | Kurata | B62D 25/2036 296/193.07 |
| 8,480,165 B2 | * | 7/2013 | Koyama | B62D 25/2027 296/203.04 |
| 8,714,636 B2 | * | 5/2014 | Wanke | B62D 25/20 296/203.02 |
| 9,132,859 B2 | * | 9/2015 | Yamaji | B29C 65/0618 |

FOREIGN PATENT DOCUMENTS

| | | |
|---|---|---|
| CN | 101434264 B | 10/2010 |
| CN | 102390438 A | 3/2012 |
| CN | 102632932 A | 8/2012 |
| CN | 102862612 A | 1/2013 |
| CN | 206623891 U | 11/2017 |

(Continued)

*Primary Examiner* — Dennis H Pedder
(74) *Attorney, Agent, or Firm* — Fox Rothschild LLP

(57) ABSTRACT

An underbody for a vehicle may arrange and couple a plurality of assemblies forming the underbody in a vertically laminating structure. The underbody includes a panel assembly configured to form a floor of a vehicle interior; an upper member assembly configured to be laminated on and coupled to an upper side of the panel assembly; and a lower member assembly configured to be laminated on and coupled to a lower side of the panel assembly and coupled to a side portion of the panel assembly and a side portion of the upper member assembly.

11 Claims, 14 Drawing Sheets

(56) References Cited

FOREIGN PATENT DOCUMENTS

| | | |
|---|---|---|
| CN | 104802863 B | 9/2018 |
| JP | 2006-088790 A | 4/2006 |
| KR | 2017-0069502 A | 6/2017 |

* cited by examiner

US 11,873,030 B2

UNDERBODY FOR VEHICLE

CROSS-REFERENCE TO RELATED APPLICATION

This application claims under 35 U.S.C. § 119(a) the benefit of Korean Patent Application No. 10-2021-0025222 filed on Feb. 25, 2021, the entire contents of which are incorporated herein by reference.

BACKGROUND

(a) Technical Field

The present disclosure relates to an underbody for a vehicle, more particularly, to a vehicle underbody having a plurality of assemblies, which are arranged and coupled in a vertically laminated structure.

(b) Description of the Related Art

Generally, an underbody for a vehicle is configured to support a front seat and a rear seat and divide an interior from an exterior of a vehicle.

A conventional underbody is composed of a front floor unit configured to support a front seat, a rear floor unit configured to support a rear seat, a dash member unit disposed on a front of the front floor unit to divide the interior from the exterior of the vehicle, a back member unit disposed on a rear of the rear floor unit, and a front side member unit disposed on a front of the dash member unit.

Such a conventional underbody is completely assembled by arranging and coupling the respective units in front and rear directions. To this end, the respective units typically are supplied from different manufacturers to an assembly company, and the assembly company completes the underbody by coupling the units supplied by the manufacturers.

However, in the conventional underbody, there inevitably occurs a problem of parting and disconnecting connection portions of the units due to the respective units arranged and coupled in the front and rear directions.

Therefore, if the units arranged in the front and rear directions are parted, the conventional underbody recouples the parted units by welding or a bolt, and as a result, the quality and the performance are lowered by the manufacturing tolerances of the recoupled units.

The above information disclosed in this Background section is only for enhancement of understanding of the background of the disclosure and accordingly it may include information that does not form the prior art that is already known in this country to a person of ordinary skill in the art.

SUMMARY

The present disclosure provides an under body for a vehicle comprising a plurality of assemblies, which are arranged and coupled in a vertically laminated structure, thereby solving conventional problems and thus improving quality and performance.

Therefore, the present disclosure provides an underbody for a vehicle including a panel assembly configured to form a floor of a vehicle interior; an upper member assembly configured to be laminated on and coupled to an upper side of the panel assembly; and a lower member assembly configured to be laminated on and coupled to a lower side of the panel assembly and coupled to a side portion of the panel assembly and a side portion of the upper member assembly.

The panel assembly includes a dash panel configured to divide an interior from an exterior of a vehicle; a center floor panel fixed to a lower end of the dash panel, and extending from the lower end of the dash panel backward to form a floor of a front portion of the vehicle interior; and a rear floor panel fixed to a rear end of the center floor panel, and extending from the rear end of the center floor panel backward to form a floor of a rear portion of the vehicle interior.

Further, the panel assembly includes a vertical panel having an upper end fixed to a front end of the rear floor panel and a lower end fixed to the rear end of the center floor panel to connect the center floor panel to the rear floor panel.

Further, the center floor panel has a center tunnel part on a central portion thereof in the form raised upward.

Further, the rear floor panel has a trunk room panel part on a rear portion thereof that is recessed downward.

Further, the lower member assembly includes a pair of side sills fixed, respectively, to a left end and a right end of the center floor panel; a pair of front side members having a rear portion fixed to a front end of each side sill and a lower portion of a front surface of the dash panel, and a front portion extending to a front of the dash panel; a pair of rear side members fixed to a rear portion of each side sill to extend to a rear end of the rear floor panel, and fixed to each of a left portion and a right portion of the rear floor panel; a front cross member connecting front ends of the pair of rear side members and fixed to the vertical panel; and a rear cross member disposed on a rear of the front cross member, and connecting central portions of the pair of rear side members and fixed to a lower surface of the rear floor panel.

Further, the lower member assembly includes a trunk room reinforcement disposed on a rear of the rear cross member, connecting rear portions of the pair of rear side members and fixed to the trunk room panel part; and a connecting member connecting the trunk room reinforcement to the rear cross member and fixed to the lower surface of the rear floor panel.

Further, the lower member assembly includes a pair of tunnel side reinforcements each having a front end fixed to a rear portion of a corresponding front side member, a rear end fixed to each of a left portion and a right portion of the front cross member and fixed to the lower surface of the center floor panel; and at least one brace connecting the pair of tunnel side reinforcements and fixed to a lower surface of the center tunnel part.

Meanwhile, the upper member assembly includes a dash reinforcement fixed to an upper portion of a rear surface of the dash panel to reinforce the dash panel; a tunnel reinforcement fixed to an upper portion of the center tunnel part to reinforce the center tunnel part; a dash lower member fixed to a lower end of the dash reinforcement and a front end of the tunnel reinforcement to connect the dash reinforcement to the tunnel reinforcement, and fixed to a lower portion of a rear surface of the dash panel; and a plurality of seat cross members having a first end fixed to a side surface of the tunnel reinforcement, and a second end fixed to an upper portion of the side sill.

Further, the upper member assembly includes a pair of front side reinforcements fixed to each of a left end and a right end of the dash lower member and fixed to the lower portion of the rear surface of the dash panel.

Further, a rear end of the tunnel reinforcement is coupled and fixed to the vertical panel.

Further, the first end of the seat cross member is fixed to the side surface of the tunnel reinforcement and fixed to the side surface of the center tunnel part, and a central portion between the first end and second end of the seat cross member is fixed to the upper surface of the center floor panel.

According to the above configuration, the underbody according to the present disclosure may be composed of the panel assembly, the upper member assembly, and the lower member assembly, which are vertically laminated, arranged and coupled, thereby improving the bending strength and the torsional strength due to the structurally increasing rigidity of the vehicle body, and eventually solving the conventional problem of lowering the quality and the performance due to the coupling structure of the underbody.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
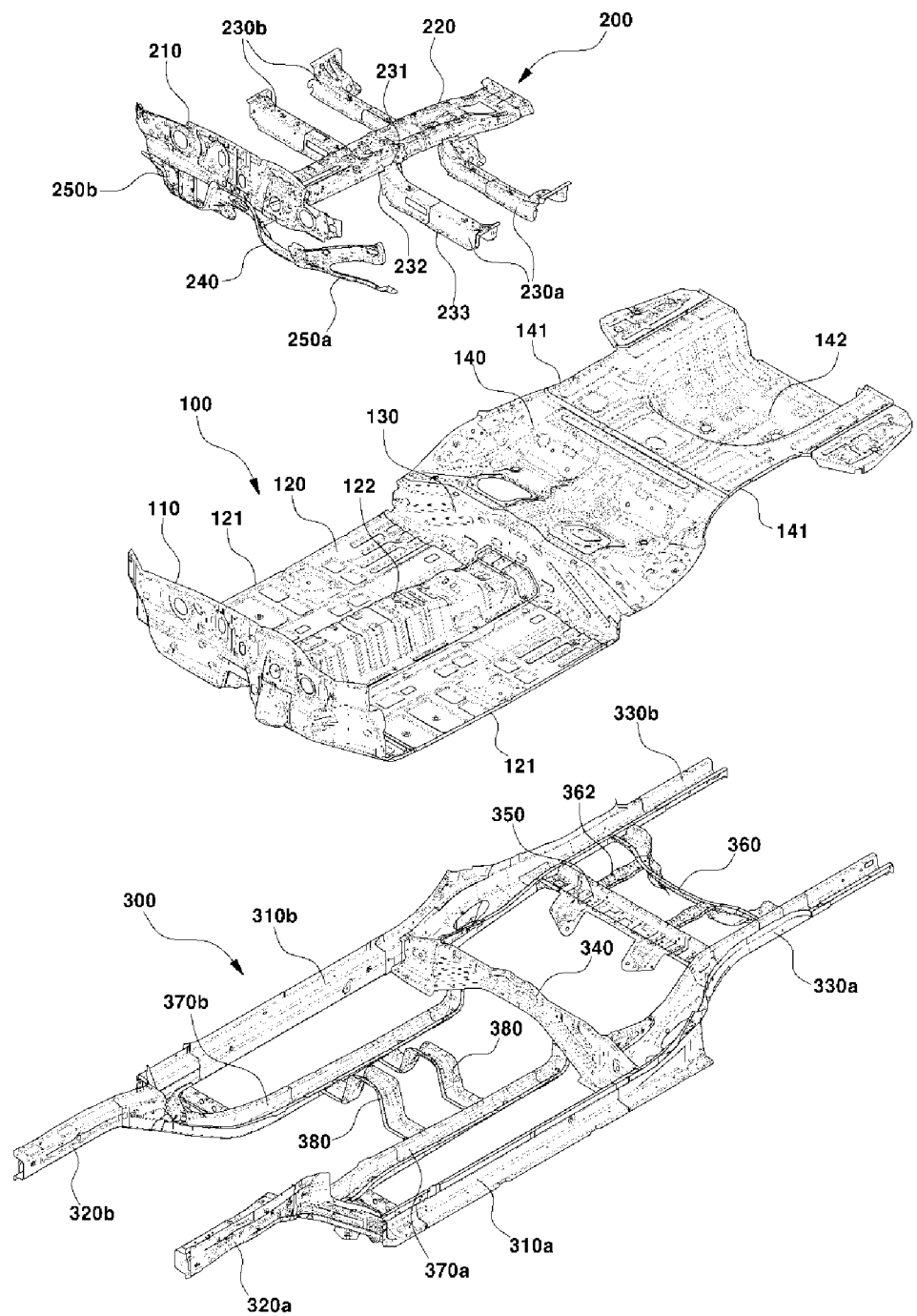
FIG. 1 is an exploded perspective diagram illustrating an underbody for a vehicle according to the present disclosure.
Figure 2:
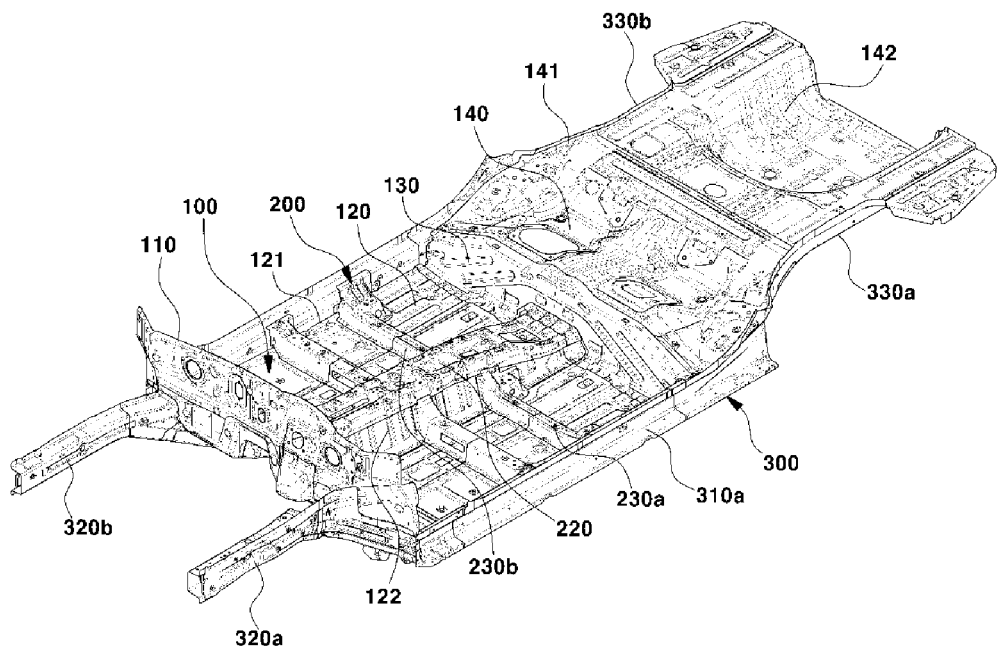
FIGS. 2 to 5 are coupling perspective diagrams illustrating the underbody for the vehicle according to the present disclosure.
Figure 3:
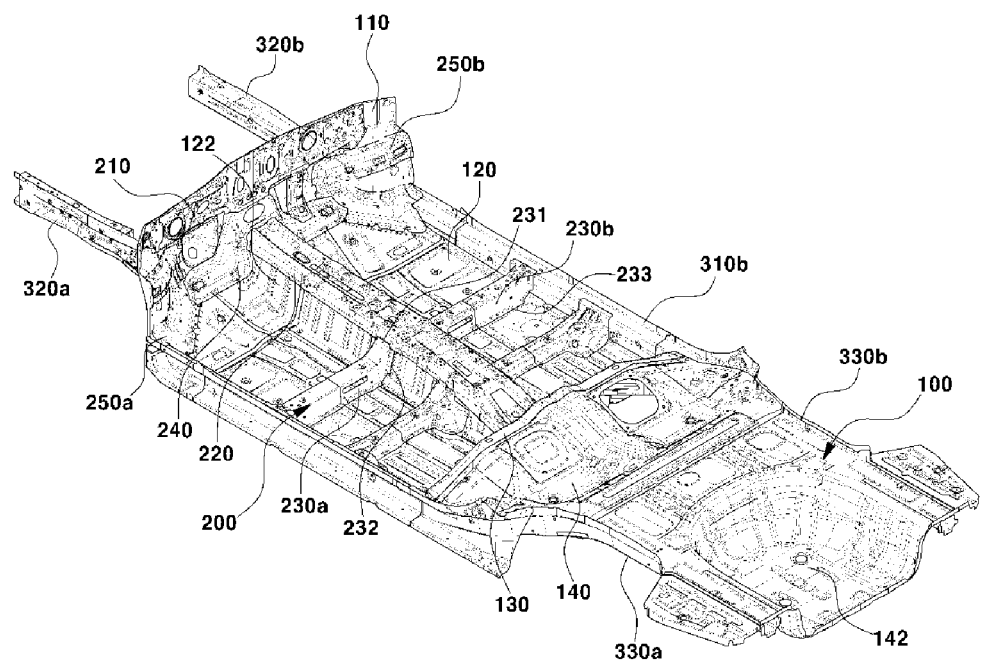
Figure 4:
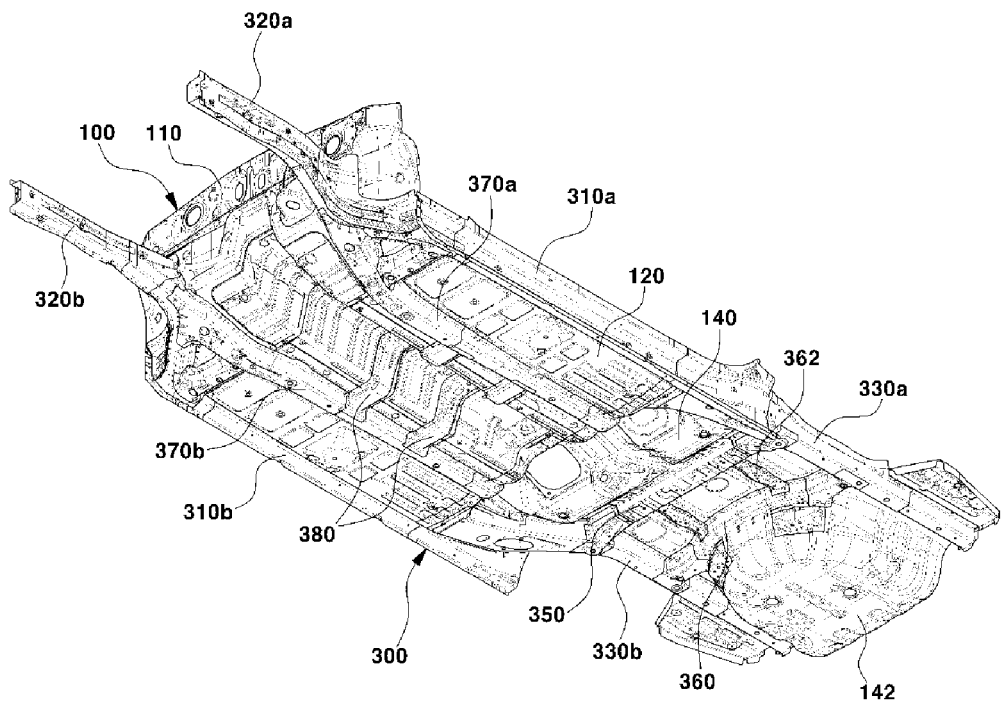
Figure 5:
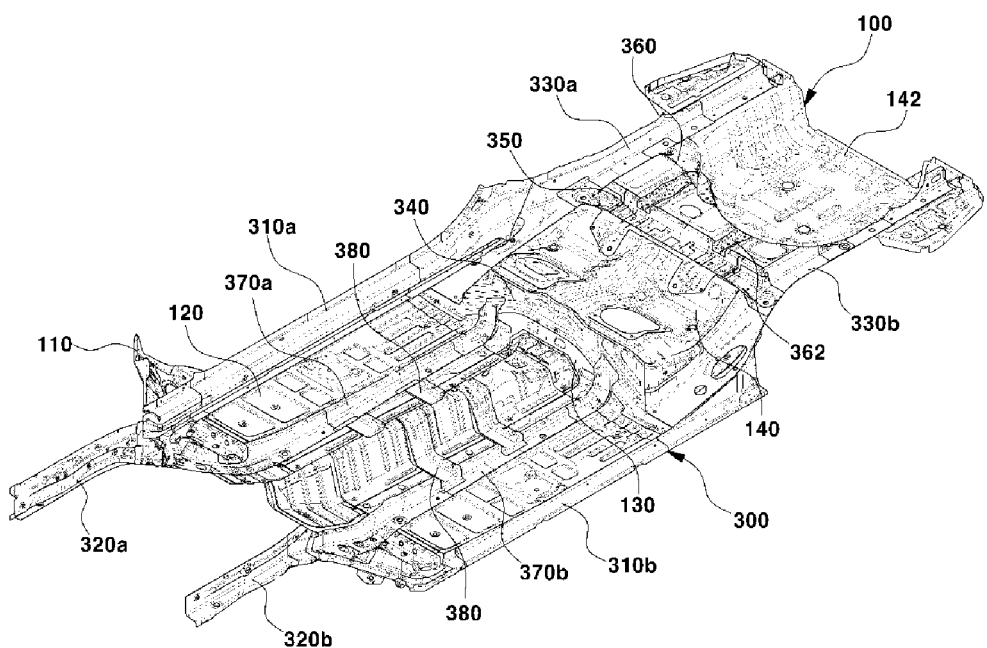

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described with reference to the accompanying drawings. The contents expressed by the accompanying drawings are drawings illustrated for easily explaining the exemplary embodiment of the present disclosure and may be different from the form being actually implemented.

The present disclosure relates to an underbody for a vehicle configured to form a floor of a vehicle interior to support a front seat and a rear seat and may arrange and couple a plurality of assemblies configuring the underbody in a vertically laminating structure, thereby solving a conventional problem of lowering the quality and performance of the underbody.

As provided herein, the term "reinforcement" refers to a part of a vehicle underbody that provides reinforcement, e.g., to an underbody structure, where the term "reinforcement" is synonymous with "reinf" that may be used in the automotive industry to refer to such parts.

As illustrated in FIGS. 1 to 5, an underbody according to the present disclosure includes a panel assembly 100 configured to form a floor of a vehicle interior, an upper member assembly 200 configured to be laminated on and coupled to an upper portion of the panel assembly 100, and a lower member assembly 300 configured to be laminated on and coupled to a lower portion of the panel assembly 100.

The panel assembly 100 is configured to support a front seat and a rear seat provided in the vehicle interior, and to divide the vehicle interior and a vehicle exterior.

Figure 6:
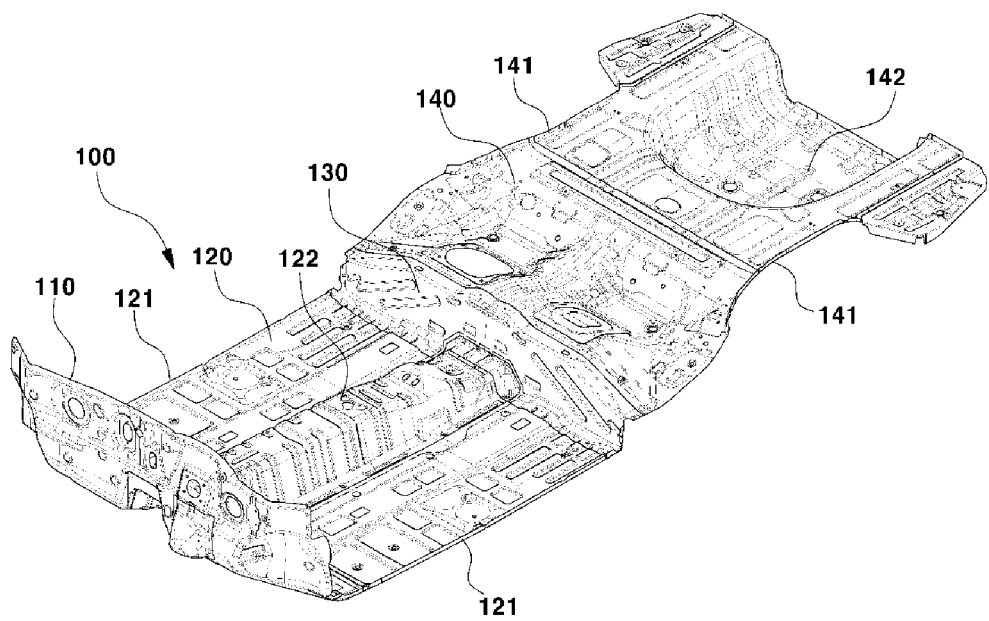
FIGS. 6 to 8 are perspective diagrams illustrating a panel assembly of the underbody for the vehicle according to the present disclosure.
Figure 7:
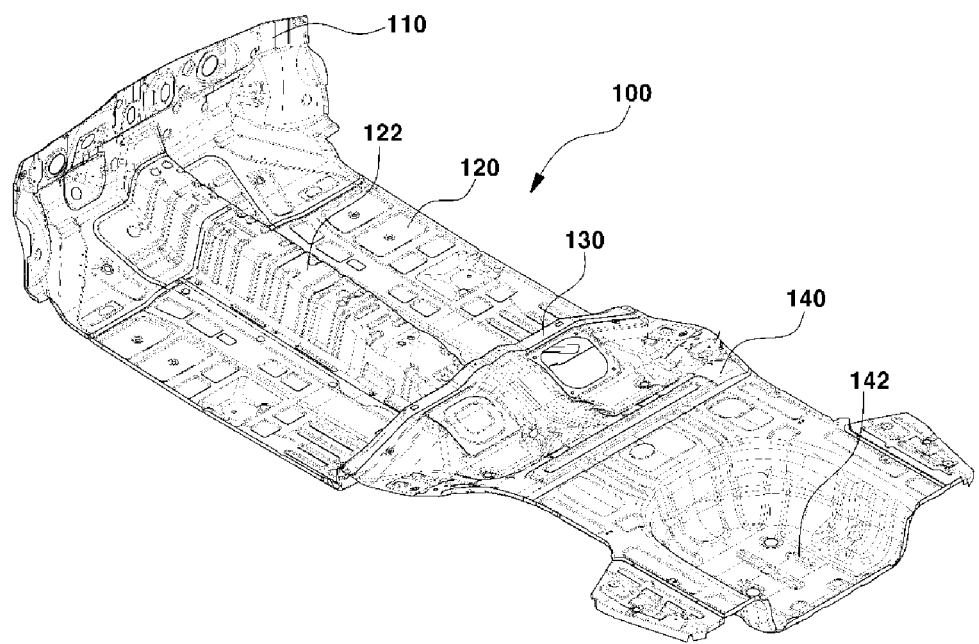
Figure 8:
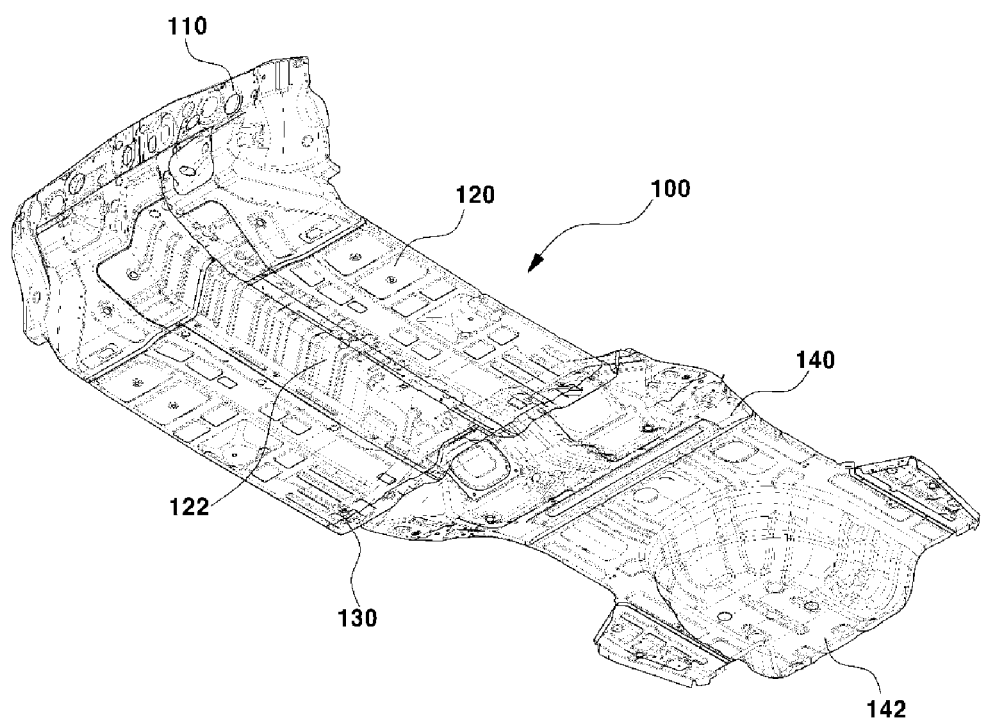

As illustrated in FIGS. 6 to 8, the panel assembly 100 may include a dash panel 110, a center floor panel 120, a rear floor panel 140, and a vertical panel 130.

The dash panel 110 is configured to partition and divide the vehicle interior and the vehicle exterior. The vehicle exterior includes an engine room disposed on a front of the front seat.

The center floor panel 120 is coupled and fixed to a lower end of the dash panel 110 and extends from the lower end of the dash panel 110 to a rear of the vehicle to form a floor of a front portion of the vehicle interior. For example, the front seat may be disposed on the floor of the front portion of the vehicle interior.

The center floor panel 120 has a front end coupled to the lower end of the dash panel 110, and the front end of the center floor panel 120 may be coupled to the lower end of the dash panel 110 by welding.

All components configuring the underbody may be coupled to one another by welding and may use a known coupling technology generally used for coupling the components other than welding. Further, the components of the underbody may have a welding flange or the like for coupling by welding.

Further, the center floor panel 120 has a center tunnel part 122 on a horizontal central portion of the vehicle.

The center tunnel part 122 is configured in the form of being raised upward from the central portion of the center floor panel 120. The center tunnel part 122 is formed in a structure of being bent in an oblong structure and raised upward.

The rear floor panel 140 is coupled and fixed to a rear end of the center floor panel 120 and extends from the rear end of the center floor panel 120 to the rear of the vehicle to form a floor of a rear portion of the vehicle interior. For example, the rear seat may be disposed on the floor of the rear portion of the vehicle interior.

The rear floor panel 140 has a front end coupled to the rear end of the center floor panel 120, and the front end of the rear floor panel 140 may be coupled to the rear end of the center floor panel 120 by welding.

The rear floor panel 140 may have a trunk room panel part 142 on a rear portion thereof. The trunk room panel part 142 is the portion forming a floor and a sidewall of a trunk room and disposed on a rear of the vehicle interior. The trunk room panel part 142 may be formed in the form of being bent and recessed downward from the rear portion of the rear floor panel 140. A spare tire or the like may be stored in the trunk room.

The rear floor panel 140 may be connected to the center floor panel 120 through the vertical panel 130.

The vertical panel 130 has an upper end coupled and fixed to the front end of the rear floor panel 140, and a lower end coupled and fixed to the rear end of the center floor panel 120 to connect the rear end of the center floor panel 120 to the front end of the rear floor panel 140.

The vertical panel 130 may vertically extend from the rear end of the center floor panel 120 to the front end of the rear floor panel 140.

As illustrated in FIGS. 2 to 5, the lower member assembly 300 is configured to be laminated on and fixed to the lower side of the panel assembly 100 and fixed to a side portion of the panel assembly 100 and a side portion of the upper member assembly 200.

Figure 9:
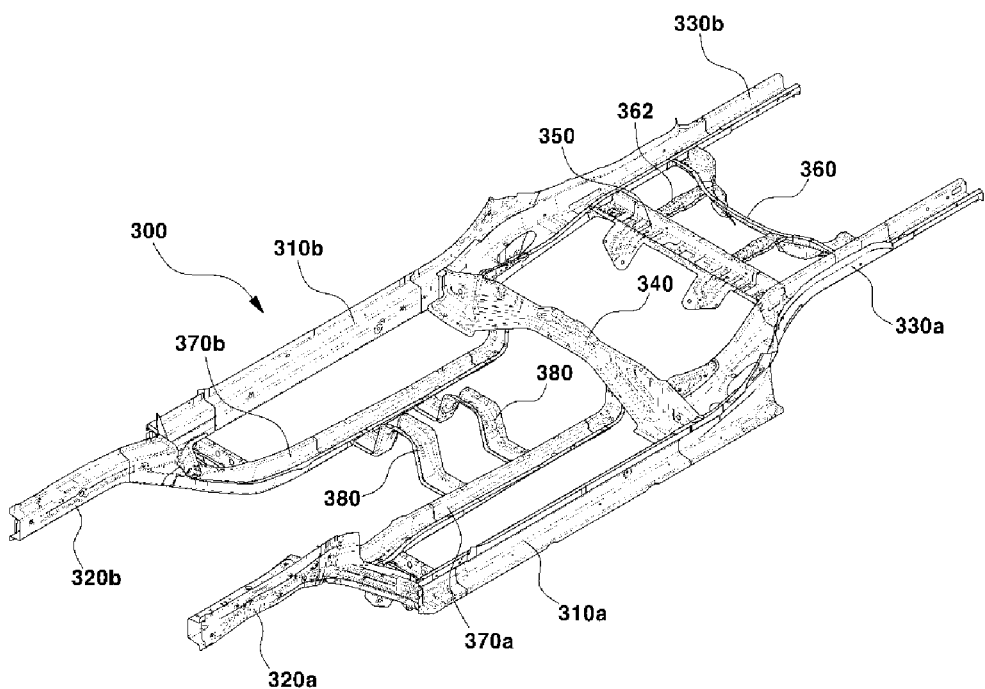
FIGS. 9 to 11 are perspective diagrams illustrating a lower member assembly of the underbody for the vehicle according to the present disclosure.
Figure 10:
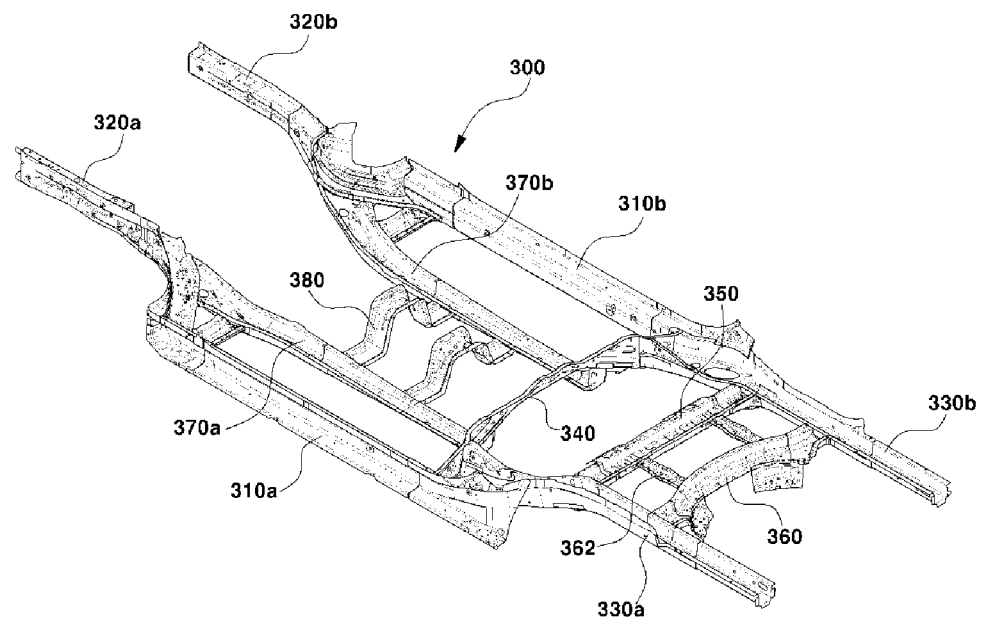
Figure 11:
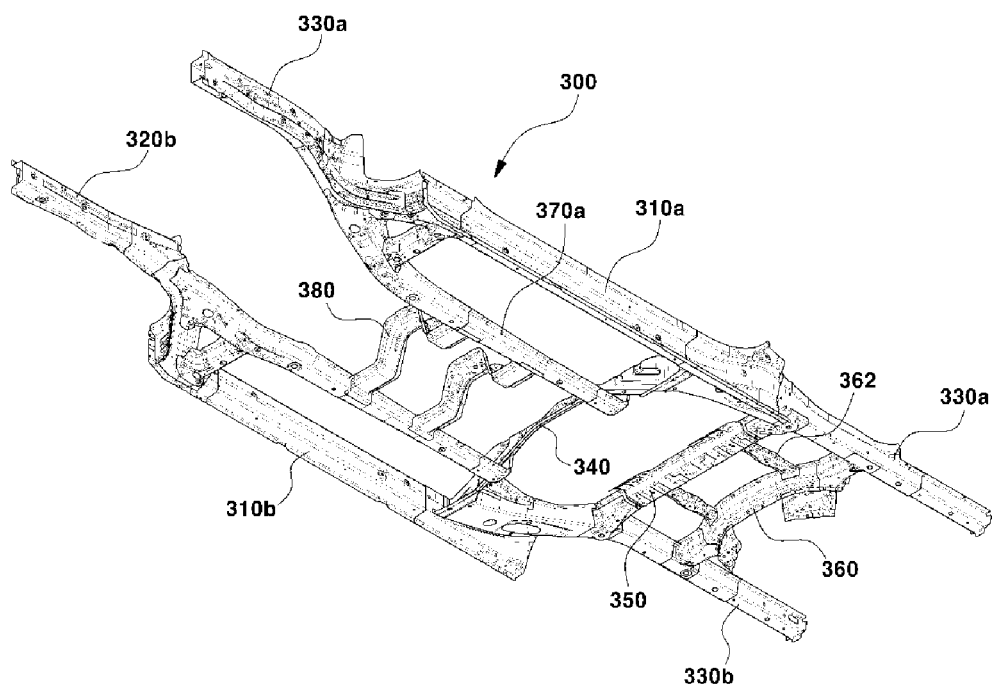

As illustrated in FIGS. 9 to 11, the lower member assembly 300 includes a main longitudinal member composed of a pair of side sills 310a, 310b, a pair of front side members 320a, 320b, and a pair of rear side members 330a, 330b, and a reinforcement member composed of a front cross member 340 and a rear cross member 350.

The main longitudinal member is the main member configuring the basic skeleton of the lower member assembly 300 to absorb the collision energy.

Further, the lower member assembly 300 may include a brace 380 and tunnel side reinforcements 370a, 370b for reinforcing the center tunnel part 122, and a trunk room reinforcement 360 for reinforcing the trunk room panel part 142.

Each of the pair of side sills 310a, 310b may be configured in a beam form having a predetermined length in the front and rear directions of the vehicle. The pair of side sills 310a, 310b are fixed to each of a left end and a right end of the center floor panel 120, when the lower member assembly 300 is coupled to the panel assembly 100.

Each of the left end and right end of the center floor panel 120 may be provided with a center side flange 121. The center side flange 121 may be coupled and fixed to lower portions of side surfaces of the side sills 310a, 310b by welding. Ends of seat cross members 230a, 230b configuring the upper member assembly 200 are coupled and fixed to upper portions of the side surfaces of the side sills 310a, 310b.

Each of the pair of front side members 320a, 320b may be configured in the beam form having a rear portion bent. Each of the pair of front side members 320a, 320b is coupled and fixed to front ends of the side sills 310a, 310b. A rear end of the front side member 320a disposed at the left side is coupled to the front end of the side sill 310a disposed at the left side, and the rear end of the front side member 320b disposed at the right side is coupled to the front end of the side sill 310b disposed at the right side.

The front side members 320a, 320b are coupled and fixed to the lower portion of the front surface of the dash panel 110, when the lower member assembly 300 is coupled to the panel assembly 100. The rear portion of the front side member 320a disposed at the left side may be coupled to a left lower portion of the dash panel 110 by welding, and the rear portion of the front side member 320b disposed at the right side may be coupled to a right lower portion of the dash panel 110 by welding. The front portions of the front side members 320a, 320b are disposed to extend to a front of the dash panel 110.

Each of the pair of rear side members 330a, 330b may be configured in the beam form having a front portion bent. Each of the pair of rear side members 330a, 330b is coupled and fixed to the rear portions of the side sills 310a, 310b. A front portion of the rear side member 330a disposed at the left side is coupled to the rear portion of the side sill 310a disposed at the left side and disposed at a position inside the vehicle compared to the side sill 310a. A front portion of the rear side member 330b disposed at the right side is coupled to the rear portion of the side sill 310b disposed at the right side and disposed at a position inside the vehicle compared to the side sill 310b.

The rear side members 330a, 330b are coupled and fixed to the lower surface of the rear floor panel 140, when the lower member assembly 300 is coupled to the panel assembly 100. The rear side member 330a disposed at the left side may be coupled to a left lower surface of the rear floor panel 140 by welding, and the rear side member 330b disposed at the right side may be coupled to a right lower surface of the rear floor panel 140 by welding. The rear side members 330a, 330b may be disposed to extend to the rear end of the rear floor panel 140.

Further, each of the rear side members 330a, 330b is also coupled and fixed to the left portion and right portion of the rear floor panel 140. Each of the rear side members 330a, 330b may be formed to have a sectional structure of being bent in a '⊏' shape, and the outer sidewalls thereof may extend to the side portion of the rear floor panel 140 and be fixed to the side portion of the rear floor panel 140. The left portion and right portion of the rear floor panel 140 may be provided with a rear side flange 141. The rear side flange 141 may be coupled to a left sidewall of the rear side member 330a disposed at the left side and a right sidewall of the rear side member 330b disposed at the right side, respectively, by welding.

The front cross member 340 is configured to connect the front ends of the pair of rear side members 330a, 330b. The front cross member 340 is formed to extend in the left and right directions of the vehicle and connects the front end of the rear side member 330a disposed at the left side to the front end of the rear side member 330b disposed at the right side. At this time, A left portion of the front cross member 340 is coupled and fixed to the front end of the rear side member 330a disposed at the left side, and a right portion of the front cross member 340 is coupled and fixed to the front end of the rear side member 330b disposed at the right side.

The front cross member 340 is coupled and fixed to a rear surface of the vertical panel 130, when the lower member assembly 300 is coupled to the panel assembly 100. The front cross member 340 may be coupled to the rear surface of the vertical panel 130 by welding.

The rear cross member 350 is disposed to be spaced apart from a rear of the front cross member 340 and configured to connect central portions of the pair of rear side members 330a, 330b. The rear cross member 350 is formed to extend in the left and right directions (i.e., transverse direction) of the vehicle. A left portion of the rear cross member 350 is coupled and fixed to the central portion of the rear side member 330a disposed at the left side, and a right portion of the rear cross member 350 is coupled and fixed to the central portion of the rear side member 330b disposed at the right side.

The rear cross member 350 is coupled and fixed to the lower surface of the rear floor panel 140, when the lower member assembly 300 is coupled to the panel assembly 100. The rear cross member 350 may be coupled to the lower surface of the rear floor panel 140 by welding.

The trunk room reinforcement 360 formed to extend in the transverse direction is disposed on a rear of the rear cross member 350. The trunk room reinforcement 360 is configured to connect the rear portions of the pair of rear side members 330a, 330b. A left end of the trunk room reinforcement 360 may be coupled to the rear portion of the rear side member 330a disposed at the left side by welding, and a right end of the trunk room reinforcement 360 may be coupled to the rear portion of the rear side member 330b disposed at the right side by welding.

The trunk room reinforcement 360 may have a central portion configured that is smoothly bent corresponding to a sidewall surface structure of the trunk room panel part 142. The central portion of the trunk room reinforcement 360 is coupled and fixed to the sidewall surface of the trunk room panel part 142, when the lower member assembly 300 is coupled to the panel assembly 100. The central portion of the trunk room reinforcement 360 may be coupled and fixed to the sidewall surface of the trunk room panel part 142 by welding.

The trunk room reinforcement 360 may be connected to the rear cross member 350 through at least one connecting member 362. That is, the connecting member 362 is configured to connect the trunk room reinforcement 360 to the rear cross member 350. A front end of the connecting member 362 is coupled and fixed to the rear cross member 350, and a rear end of the connecting member 362 is coupled and fixed to the trunk room reinforcement 360.

The connecting member 362 may be coupled to the lower surface of the rear floor panel 140 by welding, when the lower member assembly 300 is coupled to the panel assembly 100.

Each of the pair of tunnel side reinforcements 370a, 370b is formed to extend in the front and rear directions (i.e., longitudinal direction) of the vehicle, and configured to connect the front side members 320a, 320b to the front cross member 340.

The pair of tunnel side reinforcements 370a, 370b has longitudinal front ends fixed to the rear portions of the respective front side members 320a, 320b, and longitudinal rear ends fixed to the left portion and right portion of the front cross member 340. The front end and rear end of the tunnel side reinforcement 370b disposed at the right side may be coupled to the rear portion of the front side member 320b and the right portion of the front cross member 340, which are disposed at the right side, respectively, by welding. The tunnel side reinforcement 370a disposed at the left side may be coupled to the rear portion of the front side member 320a and the left portion of the front cross member 340, which are disposed at the left side, respectively, by welding.

The pair of tunnel side reinforcements 370a, 370b are coupled and fixed to the lower surface of the center floor panel 120, when the lower member assembly 300 is coupled to the panel assembly 100.

The pair of tunnel side reinforcements 370a, 370b are connected to each other through at least one brace 380.

That is, the brace 380 is configured to connect the pair of tunnel side reinforcements 370a, 370b. The brace 380 is configured to have a bending structure which is similar to or the same as that of the center tunnel part 122. A right end of the brace 380 is coupled and fixed to the tunnel side reinforcement 370b disposed at the right side, and a left end of the brace 380 is coupled and fixed to the tunnel side reinforcement 370a disposed at the left side.

The brace 380 is coupled and fixed to the lower surface of the center tunnel part 122, when the lower member assembly 300 is coupled to the panel assembly 100.

If a plurality of braces 380 are disposed between the pair of tunnel side reinforcements 370a, 370b, the plurality of braces 380 are disposed to be spaced apart from each other in the longitudinal direction.

As illustrated in FIGS. 2 to 5, the upper member assembly 200 is configured to be laminated on and coupled to the upper portion of the panel assembly 100 and also coupled to the lower member assembly 300. The upper member assembly 200 is coupled to a component protruding upward from the panel assembly 100 among the components of the lower member assembly 300.

Figure 12:
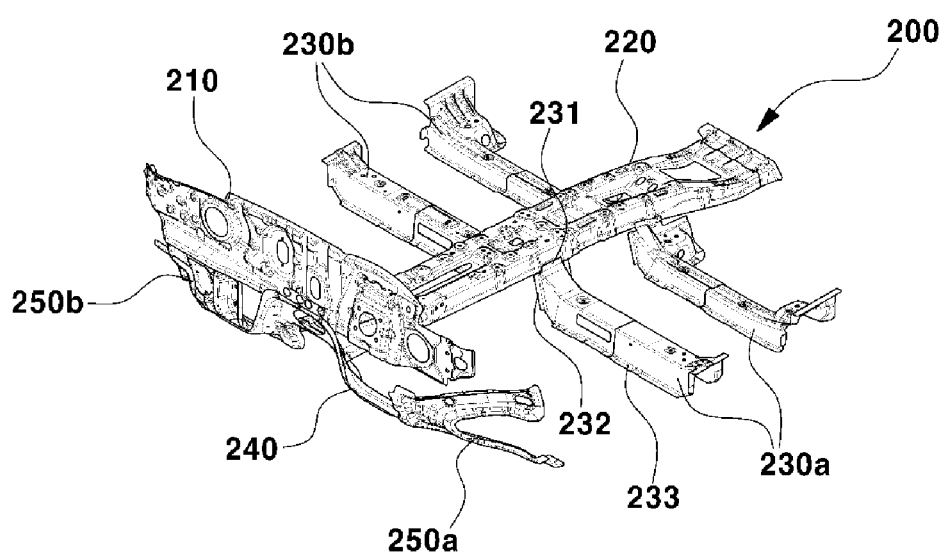
FIGS. 12 to 14 are perspective diagrams illustrating an upper member assembly of the underbody for the vehicle according to the present disclosure.
Figure 13:
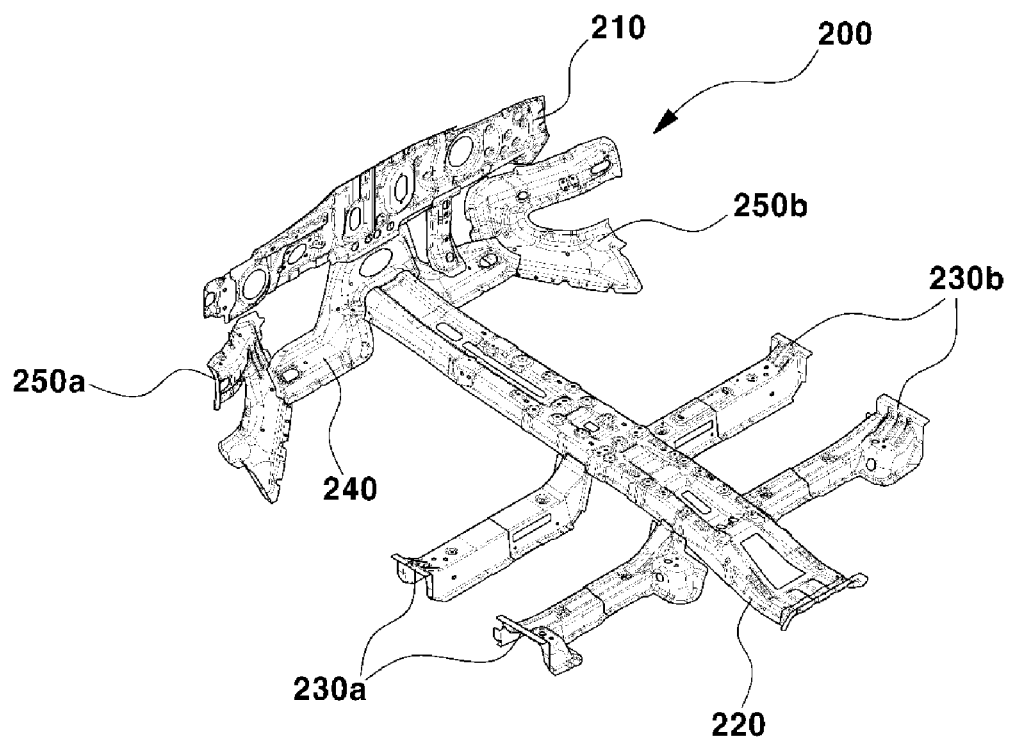
Figure 14:
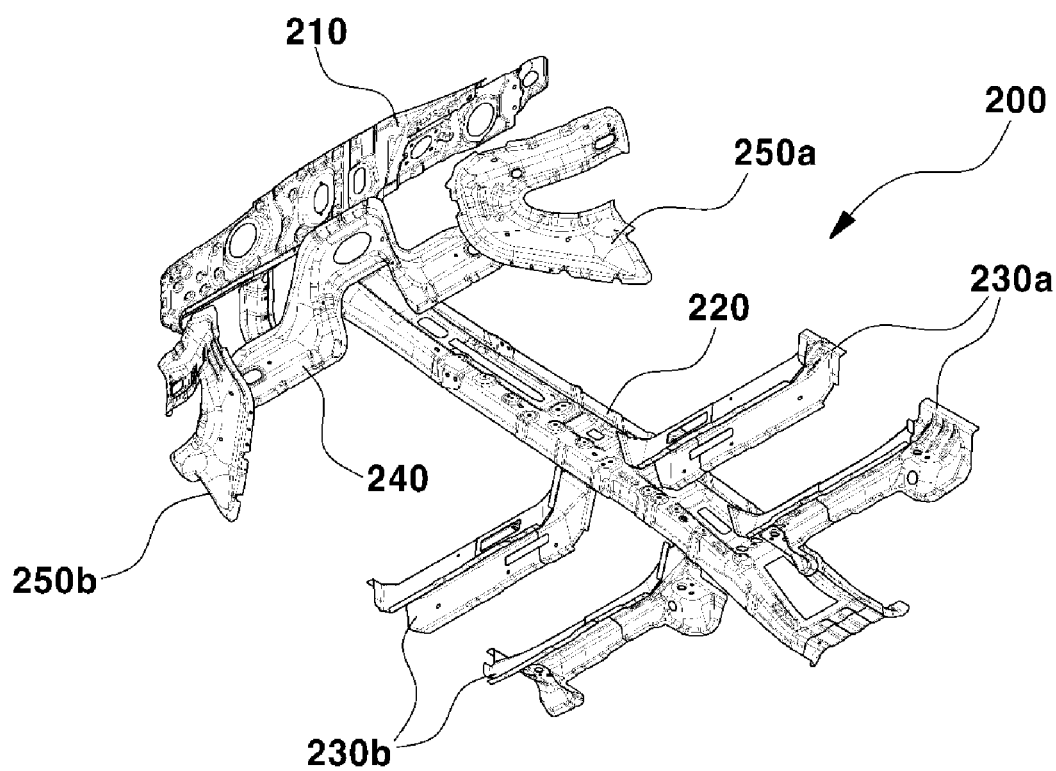

As illustrated in FIGS. 12 to 14, the upper member assembly 200 includes a dash reinforcement 210, a tunnel reinforcement 220, a plurality of seat cross members 230a, 230b, a dash lower member 240, and a pair of front side reinforcements 250a, 250b.

The dash reinforcement 210 is coupled to the rear surface of the dash panel 110 to reinforce the dash panel 110. The dash reinforcement 210 may be formed to extend in the transverse direction and coupled to an upper portion of a rear surface of the dash panel 110 by welding.

The dash reinforcement 210 is coupled and fixed to the dash panel 110, when the upper member assembly 200 is coupled to the panel assembly 100.

The tunnel reinforcement 220 is configured to be fixed to the upper portion of the center tunnel part 122 to reinforce the center tunnel part 122. The tunnel reinforcement 220 is formed to be bent to cover the upper portion of the center tunnel part 122. The tunnel reinforcement 220 may be formed to be bent in a structure of about a '☐' shape.

The tunnel reinforcement 220 may be fixed to the upper portion of the center tunnel part 122 in the form covering the upper surface of the center tunnel part 122 and the upper portion of the side surface thereof. A lower portion of a side surface of the center tunnel part 122 is not covered by the tunnel reinforcement 220.

The tunnel reinforcement 220 is connected to the dash reinforcement 210 through the dash lower member 240 and formed to extend in the front and rear directions (i.e., longitudinal direction) of the vehicle. A front end of the tunnel reinforcement 220 is coupled and fixed to the dash lower member 240 and a rear end of the tunnel reinforcement 220 is coupled and fixed to the vertical panel 130.

The tunnel reinforcement 220 is coupled and fixed to the upper portion of the center tunnel part 122 and the front surface of the vertical panel 130, when the upper member assembly 200 is coupled to the panel assembly 100.

The dash lower member 240 is coupled and fixed to the dash reinforcement 210 and the tunnel reinforcement 220. The dash lower member 240 may be coupled to a lower end of the dash reinforcement 210 and the front end of the tunnel reinforcement 220 by welding.

The dash lower member 240 is coupled and fixed to the lower portion of the rear surface of the dash panel 110, when the upper member assembly 200 is coupled to the panel assembly 100.

The plurality of seat cross members 230*a*, 230*b* are coupled and fixed to a side surface of the tunnel reinforcement 220. The seat cross members 230*a*, 230*b* are formed in the beam form having a structure of being bent in about a '☐' shape and disposed to extend in the transverse direction in the vehicle interior.

The seat cross members 230*a*, 230*b* have first ends in the longitudinal direction coupled and fixed to the side surface of the tunnel reinforcement 220, and second ends in the longitudinal direction coupled and fixed to the side surfaces of the side sills 310*a*, 310*b*. Further, the seat cross members 230*a*, 230*b* have the central portions between the first ends and the second ends coupled and fixed to the upper surface of the center floor panel 120, and the first ends coupled to the side surface of the tunnel reinforcement 220 and also coupled to the side surface of the center tunnel part 122.

More specifically, the seat cross members 230*a*, 230*b* are in a state where only the first ends of the seat cross members 230*a*, 230*b* are coupled to the side surface of the tunnel reinforcement 220, when the upper member assembly 200 is not coupled to the panel assembly 100, that is, before the upper member assembly 200 is coupled to the panel assembly 100.

When the upper member assembly 200 is coupled to the panel assembly 100, the central portions of the seat cross members 230*a*, 230*b* are coupled to the upper surface of the center floor panel 120, the first ends of the seat cross members 230*a*, 230*b* are coupled to the lower portion of the side surface of the center tunnel part 122, and the second ends of the seat cross members 230*a*, 230*b* are coupled to the side surfaces of the side sills 310*a*, 310*b*.

The first ends of the seat cross members 230*a*, 230*b* may be provided with a first flange 231 coupled to the side surface of the tunnel reinforcement 220 and a second flange 232 coupled to the lower portion of the side surface of the center tunnel part 122. The central portions of the seat cross members 230*a*, 230*b* may be provided with a lower flange 233 coupled to the upper surface of the center floor panel 120.

The second ends of the seat cross members 230*a*, 230*b* are coupled and fixed to the upper portions of the side surfaces of the side sills 310*a*, 310*b*. The upper portions of the side surfaces of the side sills 310*a*, 310*b* are disposed to protrude upward from the center floor panel 120, when the lower member assembly 300 is coupled to the panel assembly 100.

The seat cross members 230*a*, 230*b* may be disposed under the front seat provided in the vehicle interior.

At least one seat cross member 230*a* is coupled to a left surface of the tunnel reinforcement 220 and at least one seat cross member 230*b* is coupled to a right surface of the tunnel reinforcement 220. The same number of seat cross members 230*a*, 230*b* may be coupled to the left surface and right surface of the tunnel reinforcement 220.

Further, the seat cross member 230*a* coupled to the left surface of the tunnel reinforcement 220 and the seat cross member 230*b* coupled to the right surface of the tunnel reinforcement 220 may be disposed to be symmetrical from side to side with respect to the tunnel reinforcement 220. Further, the seat cross member 230*a* coupled to the left surface of the tunnel reinforcement 220 and the seat cross member 230*b* coupled to the right surface of the tunnel reinforcement 220 may be configured to be symmetrical from side to side with respect to the tunnel reinforcement 220.

Each of the pair of front side reinforcements 250*a*, 250*b* is coupled and fixed to the left end and right end of the dash lower member 240 and disposed under the dash reinforcement 210.

Each of the front side reinforcements 250*a*, 250*b* may be formed in a structure of being bent in about a V shape or a U shape, and the left end or the right end of the dash lower member 240 may be coupled to the bending portion by welding.

The pair of front side reinforcements 250*a*, 250*b* may be coupled and fixed to the lower portion of the rear surface of the dash panel 110 and disposed on the rears of the front side member 320*a*, 320*b*, when the upper member assembly 200 is coupled to the panel assembly 100. The front side members 320*a*, 320*b* are coupled to the lower portion of the front surface of the dash panel 110, when the lower member assembly 300 is coupled to the panel assembly 100.

Specifically, the front side reinforcement 250*a* coupled to the left end of the dash lower member 240 may be coupled to a left lower portion of the dash panel 110 by welding. The front side reinforcement 250*b* coupled to the right end of the dash lower member 240 may be coupled to a right lower portion of the dash panel 110 by welding.

As described above, the exemplary embodiment of the present disclosure has been described in detail, and the terms or words used in the present specification and claims should not be interpreted as limited to their usual or dictionary meanings, and further, the exemplary embodiment described in the present specification and the components illustrated in the drawings are merely one exemplary embodiment of the present disclosure, such that the scope of the present disclosure is not limited to the aforementioned exemplary embodiment and various deformations and improvements by those skilled in the art using the basic concept of the present disclosure defined in the appended claims are also included in the scope of the present disclosure.

What is claimed is:

1. An underbody for a vehicle comprising:
   a panel assembly configured to form a floor of a vehicle interior;
   an upper member assembly configured to be laminated on and coupled to an upper side of the panel assembly; and
   a lower member assembly configured to be laminated on and coupled to a lower side of the panel assembly and coupled to a side portion of the panel assembly and a side portion of the upper member assembly;
   wherein the panel assembly comprises;
      a center floor panel configured to form a floor of a front portion of the vehicle interior, the center floor panel including a center tunnel part; and
      a rear floor panel fixed to a rear end of the center floor panel and extending from the rear end of the center floor panel backward to form a floor of a rear portion of the vehicle interior;
   wherein the lower member assembly comprises:
      a pair of side sills fixed to each of a left end and a right end of the center floor panel;
      a pair of front side members having a rear portion fixed to a front end of each side sill;
      a pair of rear side members fixed to the rear portion of each side sill to extend to a rear end of the rear floor panel, and fixed to each of a left portion and a right portion of the rear floor panel;
      a front cross member connecting front ends of the pair of rear side members;
      a rear cross member disposed on a rear of the front cross member and connecting central portions of the pair of rear side members and fixed to a lower surface of the rear floor panel;
      a pair of tunnel side reinforcements having a front end fixed to a rear portion of each front side member, a rear end fixed to each of a left portion and a right portion of the front cross member, and fixed to the lower surface of the center floor panel; and
      at least one brace connecting the pair of tunnel side reinforcements and fixed to α lower surface of the center tunnel part:
   wherein the upper member assembly comprises:
      a tunnel reinforcement fixed to the center tunnel part of the center floor panel; and
      a plurality of seat cross members each having a first end fixed to a side surface of the tunnel reinforcement, and a second end fixed to an upper portion of the side sill.

2. The underbody for the vehicle of claim 1, wherein the panel assembly further comprises:
   a dash panel configured to divide the vehicle interior and a vehicle exterior; and
   the center floor panel fixed to a lower end of the dash panel, and extending from the lower end of the dash panel backward to form a floor of a front portion of the vehicle interior.

3. The underbody for the vehicle of claim 2, wherein the panel assembly further comprises a vertical panel having an upper end fixed to a front end of the rear floor panel and a lower end fixed to the rear end of the center floor panel to connect the center floor panel to the rear floor panel.

4. The underbody for the vehicle of claim 2, wherein the center floor panel has the center tunnel part on a central portion thereof that is raised upward.

5. The underbody for the vehicle of claim 3, wherein the rear floor panel has a trunk room panel part on a rear portion thereof that is recessed downward.

6. The underbody for the vehicle of claim 5, wherein:
   the pair of front side members have a rear portion fixed to a lower portion of a front surface of the dash panel and a front portion extending to a front of the dash panel; and
   the front cross member is fixed to the vertical panel.

7. The underbody for the vehicle of claim 6, wherein the lower member assembly further comprises:
   a trunk room reinforcement disposed on a rear of the rear cross member, connecting rear portions of the pair of rear side members and fixed to the trunk room panel part; and
   a connecting member connecting the trunk room reinforcement to the rear cross member and fixed to the lower surface of the rear floor panel.

8. The underbody for the vehicle of claim 6, wherein the upper member assembly further comprises:
   a dash reinforcement fixed to an upper portion of a rear surface of the dash panel to reinforce the dash panel; and
   a dash lower member fixed to a lower end of the dash reinforcement and a front end of the tunnel reinforcement to connect the dash reinforcement to the tunnel reinforcement, and fixed to a lower portion of a rear surface of the dash panel.

9. The underbody for the vehicle of claim 8, wherein the upper member assembly is configured to comprise a pair of front side reinforcements fixed, respectively, to a left end and a right end of the dash lower member and fixed to the lower portion of the rear surface of the dash panel.

10. The underbody for the vehicle of claim 8, wherein a rear end of the tunnel reinforcement is coupled and fixed to the vertical panel.

11. The underbody for the vehicle of claim 8, wherein the first end of each of the plurality of seat cross members is fixed to the side surfaces of the tunnel reinforcement and fixed to the side surface of the center tunnel part, and a central portion between the first end and second end of the plurality of seat cross members is fixed to the upper surface of the center floor panel.

* * * * *